C. B. COON.
JOURNAL BOX LUBRICATING DEVICE.
APPLICATION FILED FEB. 1, 1909.
946,495.
Patented Jan. 11, 1910.
3 SHEETS—SHEET 1.
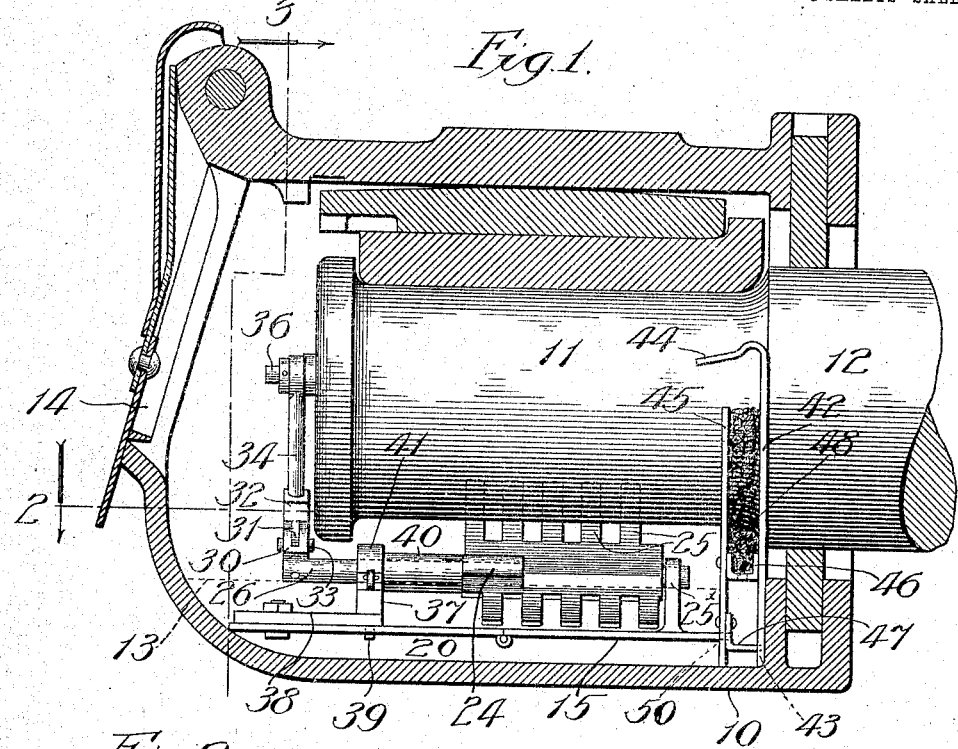
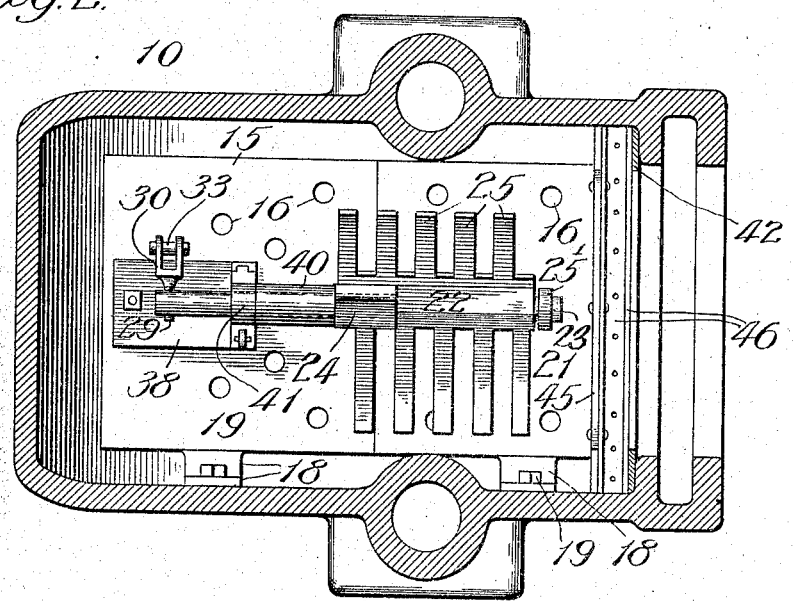
Witnesses:
John Enders
Chas. H. Bull
Inventor:
Charles B. Coon
By Dyrenforth, Lee, Chritton & Wiles
Attys.

C. B. COON.
JOURNAL BOX LUBRICATING DEVICE.
APPLICATION FILED FEB. 1, 1909.
946,495.
Patented Jan. 11, 1910.
3 SHEETS—SHEET 2.
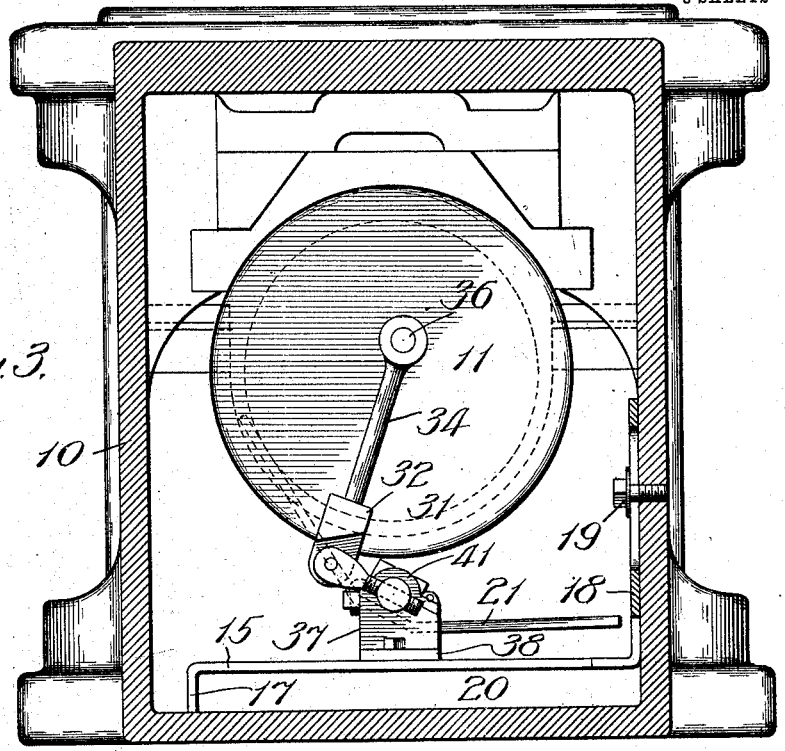
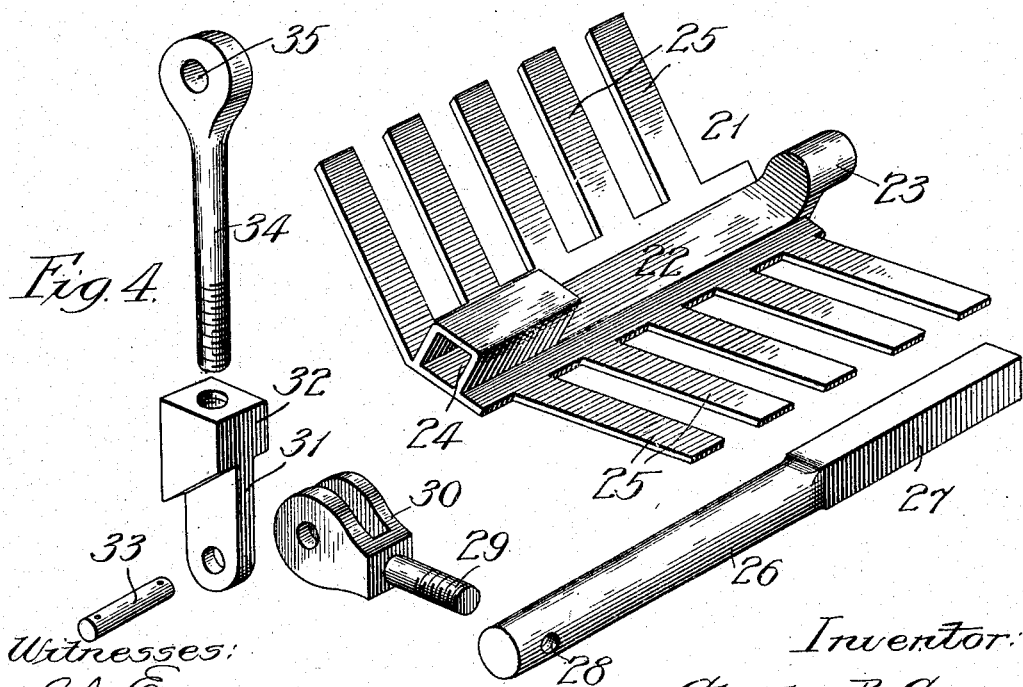
Witnesses:
John Enders
Chas. H. Buell
Inventor:
Charles B. Coon
By Dyrenforth, Lee, Chritton & Wiles
Attys.

C. B. COON.
JOURNAL BOX LUBRICATING DEVICE.
APPLICATION FILED FEB. 1, 1909.
946,495.
Patented Jan. 11, 1910.
3 SHEETS—SHEET 3.
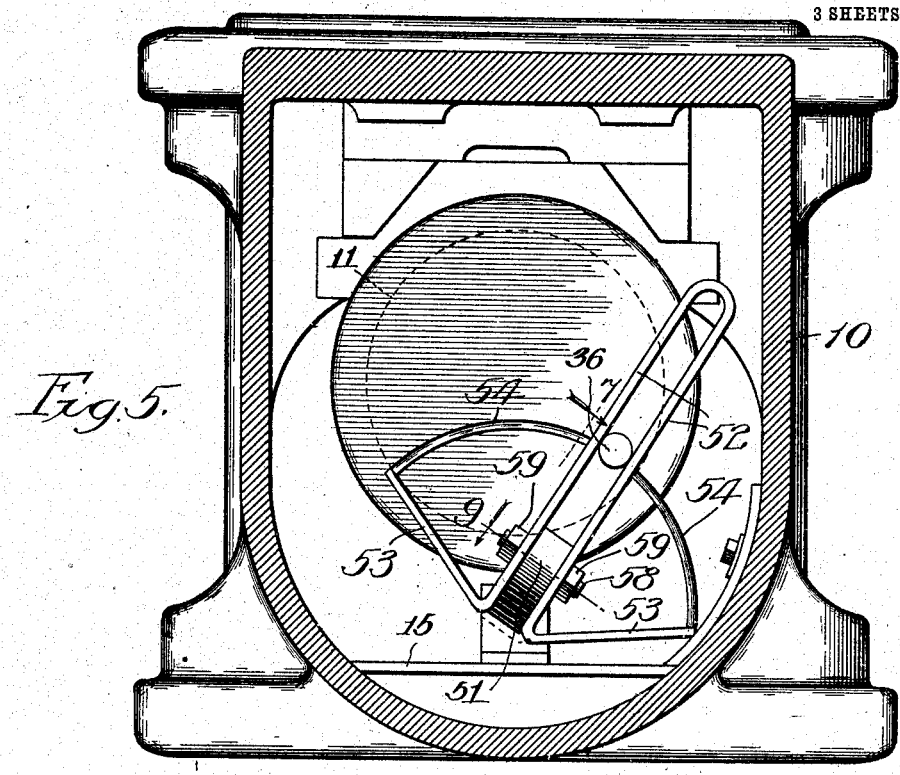
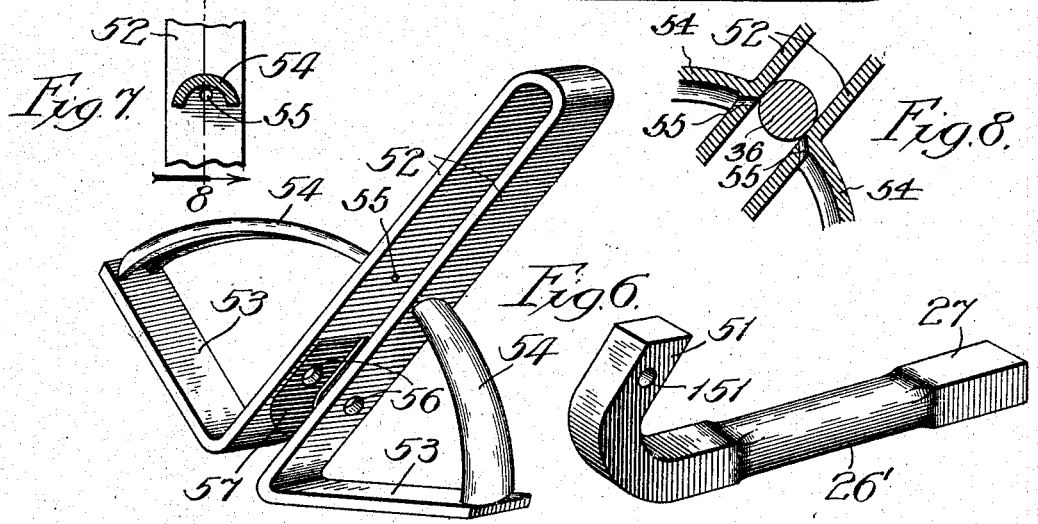
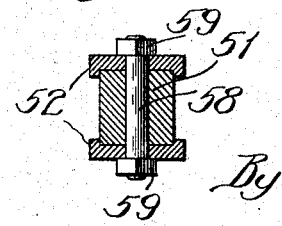
Witnesses:
John Enders
Chas. H. Buell
Inventor:
Charles B. Coon.
By Dyrenforth, Lee, Chritton & Wiles
Attys.

UNITED STATES PATENT OFFICE.

CHARLES B. COON, OF EVANSTON, ILLINOIS.

JOURNAL-BOX-LUBRICATING DEVICE.

946,495. Specification of Letters Patent. Patented Jan. 11, 1910.

Application filed February 1, 1909. Serial No. 475,490.

*To all whom it may concern:*

Be it known that I, CHARLES B. COON, a citizen of the United States, residing at Evanston, in the county of Cook and State of Illinois, have invented a new and useful Improvement in Journal-Box-Lubricating Devices, of which the following is a specification.

My invention relates to an improvement in the class of devices for use in journal-boxes, and adapted to be actuated by the axles or shafts in rotating, for applying the lubricant to the journals, and involving a carrier actuated through a connection with the axle to lift lubricant from the supply thereof in the base of the box and apply it to the journal. In the use of any known device operating on the principle thus outlined, the grit, dirt, dust and other foreign matter that unavoidably gains access to the interior of the box and mixes with the lubricant, is necessarily raised by the carrier with the lubricant and applied to the journal, with injurious effects thereon that are well known.

The primary object of my invention is to enable a movable carrier or lifter of any kind or construction, in the class of devices referred to, to be used not only for the purpose specified but for the further purpose of effecting separation of such foreign matter from the lubricant and thereby avoid, or at least materially reduce, the application of grit, and the like, to the journal.

While the means I have devised for effecting the separation referred to may be adapted for use in any construction of journal-box and involve any suitable construction of device in the class mentioned, for lifting the lubricant, my invention also includes improved means for the purpose, as also novel details of construction and combinations of parts.

In the accompanying drawings, Figure 1 is a vertical longitudinal section of a car-journal box of known type, with the journal in it of an axle, shown broken away, and equipped with my improvements; Fig. 2 is a plan section of the same taken at the line 2 on Fig. 1; Fig. 3 is a section on the irregular line 3, Fig. 1; Fig. 4 shows, by a perspective, all the parts of the lubricant-carrying device, in a preferred form, in unassembled relation; Fig. 5 is a view like that presented in Fig. 2, but showing a modified construction of actuating-connection between the journal and carrier for rocking the latter; Fig. 6 shows, in perspective, the details of the modified actuating-connection in separated relation; Fig. 7 is a section on line 7, Fig. 5; Fig. 8 is a section on line 8, Fig. 7, and Fig. 9 is an enlarged section on line 9, Fig. 5.

The journal-box 10 illustrated, or any other type of journal-box, may be used for the application to it of my invention. The journal 11 of an axle 12 is housed in the box in a usual manner and the lubricant or grease, the normal level of the supply of which is indicated by a dotted line at 13 (Fig. 1), is introduced through the front end of the box shown to be closed by a swinging door 14.

In the base-portion of the box is removably confined a false bottom 15, either provided or not with numerous apertures 16 (Fig. 2). This bottom is a metal plate fitting within the box, without necessarily extending to the sides thereof, and is provided with a depending lateral seating-flange 17 and, at the opposite edge, with upwardly-extending longitudinally-slotted straps 18, 18, through the slots in which set-screws 19 work in the adjacent side of the box to fasten the false bottom and render it adjustable in setting it. The false bottom forms a chamber 20 in the bottom of the box into which the grit and other foreign matter hereinbefore referred to is worked out of the lubricant, in the manner hereinafter described, and confined.

The carrier 21 shown is of the nature of a rocking paddle-device consisting of a central longitudinal bar 22 terminating at one end in an angular trunnion 23 and having formed upon its upper side, toward the opposite end, a rectangular socket 24; and parallel blades 25 project inclinedly from opposite edges of the central bar 22, those on one edge being in staggered relation to those on the opposite edge. The carrier is journaled at its inner end, by the trunnion 23, in a bearing $25^1$, rising from the false-bottom 15, and for connecting its opposite end with the journal 11, the details of two forms of means are shown, by ways of examples, namely in Fig. 4 and Fig. 6, respectively. The means illustrated in Fig. 4 comprise a shaft 26 having a squared end 27, which enters the socket 24, this shaft containing near its opposite end, in the cylindrical section, a transverse internally-threaded opening 28 to engage adjustably the threaded stem 29 of a yoke-head 30, adapted to embrace a tongue 31 projecting from a nut 32, the tongue and yoke being pivotally connected by a pin 33 passed transversely through them; and a headed screw-stem 34 containing an eye 35 in the head, screws into the nut and is journaled at its eye on a stud 36 projecting eccentrically from the outer end of the journal 11. The shaft 26 is journaled at its cylindrical section in a bearing 37 rising from a base-plate 38 bolted through its outer end to the false-bottom near the outer end of the latter and carrying near its opposite end a depending stud 39 to engage a stud-hole in the false-bottom, thereby to properly position the bearing 37 in applying it in place. A spacing-sleeve 40 surrounds the cylindrical section of the shaft 26 between its bearing 37 and the socket 24; and the shaft is removably confined in said bearing by any suitable means, such as a cap represented at 41 separably secured to the bearing.

Through the medium of the devices thus described, rotation of the axle 12, by the eccentric connection of its journal with the carrier 21, rocks the latter, causing its blades to dip into the lubricant-supply and carry the lubricant upwardly, applying it alternately to the journal from opposite sides and thus reliably maintaining its thorough lubrication from the supply. This result ensues whatever may be the consistency of the lubricant, thus whether it be more or less fluid or solid, the last-named condition being one to which it may be reduced by exposure to low temperature, particularly when the axle is at a standstill.

To introduce into place the parts thus described, the false-bottom and the bearing $25^1$ upon it may first be inserted into the box through its opening and fastened by the set-screws, whereupon the carrier 21 is adjusted in that bearing, and the bearing 37 is adjusted in place with the shaft 26 to journal the outer end of the carrier, and the described link-like connection is then made with the eccentric stud 36. However, before introducing these parts a lubricant-shield is inserted into the back of the box. This shield, as shown, consists of a vertical back-plate 42, recessed or U-shaped to embrace the inner end of the journal 11, and seating at its lower end on the box-bottom, adjacent to which it is provided with a series of stud-holes, one of which is indicated at 43 in Fig. 1, the upper ends of the plate being bent in a forward direction, as represented at 44 in the same figure, to act as a top to the shield; and the other member of the lubricant-shield is a similarly recessed or U-shaped vertical plate 45 resting on the box-bottom and spaced from the plate 42 by a trough 46 having a perforate bottom and secured to the plate 45 to project from its rear face near its longitudinal center, and by a lower L-shaped strut 47 secured to project from the inner face of the plate 45 to the same extent as the trough. This trough and the strut are spacers forming between the two shield-forming plates 42 and 45 a space for confining waste or absorbent material 48 for holding lubricant, which may drip into the bottom of the journal-box through the trough. The rear edge of the strut is equipped with studs to register with and enter the holes 43 in the innermost shield-plate in positioning the companion-plate, which also contains holes (one of which is indicated at 50 in Fig. 1) to receive studs projecting from the inner end of the false-bottom 15 for positioning and steadying the latter. The loose fit of the plate 45 permits any lubricant dripping from the waste to pass into the body of the box 10. The shield not only prevents lubricant from splashing through the rear end of the box, but it also provides a signal for announcing when the box requires to be replenished with lubricant, since when the supply thereof is used up, or unduly reduced and the journal becomes dry, the friction between the journal 11 and its bearing will burn the waste, emitting an odor which will attract attention and permit detection of the cause. The trough on the inner face of the plate 45 affords lodgment to the waste 48, which may be thus applied to and carried by the plate for introducing it into place.

The means illustrated in Figs. 5 to 9, inclusive, for connecting the carrier, for rocking it, with an eccentric stud 36 on the journal 11, involve the following-described construction:

The cylindrical section of the shaft $26^1$, which is provided, like the shaft in Fig. 4 and for the same purpose, with a squared end 27, terminates in a hook-shaped head 51 of rectangular cross-section, containing near its end a transverse bolt-hole 151. A metal slot-link 52, open at one end, has similar arms 53 extending outwardly at acute angles from the extremities of its open end; and from near the extremity of each arm it is connected by an inverted arc-shaped gutter 54 with the adjacent side of the slot-link to register with a small port 55 therein. The connection of the shaft $26^1$ with the link 52 is made to render it both separable and rigid, as one suitable way, by heating the link to a red heat, inserting the hook 51, without heating it, between the arms of the link to register with coincident holes 56 therein the hole 151, and swaging the link to indent the hook into the inner faces of the arms, thereby forming therein recesses like the one shown at 57 in Fig. 7, which tend to thus conform to and confine the parts against relative yielding; and the parts are joined by a bolt 58 passed through the holes 56 and 151 and fastened by nuts 59 on its ends. The slot-link embraces the eccentric stud 36 on the journal 11, rotation of which thus rocks the carrier 21 to effect lubrication of the journal in the manner described; and the movements of the slot-link will cause some of the lubricating oil to splash through the ports 55 and thence upon the stud 36 to keep it lubricated.

The working of the carrier in the lubricant performs the all-important function of my improvement of cleansing the lubricant of grit and other foreign matter. The action of the carrier in rocking in the lubricant works the foreign matter down upon the false-bottom and over its sides or through the openings in it, or both, into the chamber 20, wherein they are lodged and from which they may be removed, with refuse-lubricant, from time to time by cleaning out the box, which operation may be performed with facility because of the readiness with which the parts involving the carrier and its actuating connections are removable from and replaceable in the journal-box.

What I claim as new and desire to secure by Letters Patent is—

1. In combination with a journal-box and a journal therein, a false bottom in the box forming a chamber in the box-base and adapted to admit into said chamber foreign matter from lubricant in the box above said bottom, and a lubricant-carrier movably supported in the box between the journal and false bottom and having an actuating-connection with the journal, for the purpose set forth.

2. In combination with a journal-box and a journal therein, a false bottom in the box forming a chamber in the box-base and adapted to admit into said chamber foreign matter from lubricant in the box above said bottom, a lubricant-carrier movably supported in the box between the journal and false bottom and having an actuating connection with the journal, and a lubricant-shield in the inner end of the box, for the purpose set forth.

3. In combination with a journal-box and a journal therein, a lubricant-carrier movably supported in the box and having an actuating-connection with the journal, and a lubricant-shield in the inner end of the box comprising a pair of recessed upright plates through which the journal extends, the inner plate having forwardly-turned upper ends, and spaced projections on the inner face of the outer plate, said plates forming between them a space, for the purpose set forth.

4. In combination with a journal-box and a journal therein, a lubricant-carrier movably supported in the box and having an actuating-connection with the journal, and a lubricant-shield in the inner end of the box comprising a pair of recessed upright plates through which the journal extends, a perforate trough projecting from the inner face of the outer plate and a strut projecting therefrom below said trough, said plates forming between them a space, for the purpose set forth.

5. In combination with a journal-box and a journal therein, a false bottom in the box forming a chamber in the box-base and adapted to admit into said chamber foreign matter from lubricant in the box above said bottom, a lubricant-carrier journaled inside the box to work between the journal and false bottom and means for actuating said carrier connecting it eccentrically with the journal, for the purpose set forth.

6. In combination with a journal-box and a journal therein, a lubricant-carrier journaled inside the box below said journal and having blades extending from its opposite sides, and means connecting said carrier eccentrically with the said journal to rock the carrier on its support, for the purpose set forth.

7. In combination with a journal-box and a journal therein, a false bottom in the box forming a chamber in the box-base, a lubricant-carrier journaled inside the box between said journal and false bottom and having blades extending from its opposite sides, and means connecting said carrier eccentrically with said journal to rock the carrier between it and said false bottom, for the purpose set forth.

8. In combination with a journal-box and a journal therein, a false bottom in the box forming a chamber in the box-base, a journal-bearing near the inner end of said false bottom and a journal-bearing removably secured thereon near its outer end, a lubricant-carrier comprising a bar with blades extending inclinedly from its edges and journaled in said bearings, and means connecting said bar eccentrically with said journal to rock the carrier between it and said false bottom, for the purpose set forth.

9. In combination with a journal-box and a journal therein, a false bottom in the box forming a chamber in the box-base, journal-bearings on the false bottom, a lubricant-carrier comprising a bar with blades extending from its edges and provided on one end with a trunnion engaging one of said bearings, and on its opposite end with a socket, a shaft confined at one end in said socket and journaled in the other bearing, and means connecting said shaft eccentrically with said journal to rock the carrier between it and said false bottom, for the purpose set forth.

10. In combination with a journal-box and a journal therein having a stud projecting eccentrically from its outer end, a lubricant-carrier comprising a bar journaled inside the box and having blades extending from its edges, a socket on said bar near its outer end, a shaft confined at its inner end in said socket and journaling the carrier at its outer end, a yoke adjustably connected with the outer end of the shaft, a nut pivotally connected with the yoke, and a threaded stem engaging said nut and terminating in an eye engaging said eccentric stud, for the purpose set forth.

11. In combination with a journal-box and a journal therein having a stud projecting eccentrically from its outer end, a lubricant carrier comprising a bar journaled in the box and having blades extending from its edges, an angular socket on said bar near its outer end, a shaft having an angular end-section engaging said socket and containing near its opposite end a transverse threaded opening, said shaft journaling the carrier at its outer end, a yoke having a threaded stem engaging said opening, a nut having a tongue extending in and connected with said yoke, and a headed screw-stem engaging said nut and provided in its head with an eye engaging said eccentric journal-stud, for the purpose set forth.

12. In combination with a journal-box and a journal therein having a stud projecting eccentrically from its outer end, a false bottom in the box forming a chamber in the box-base, journal-bearings on the false bottom, a lubricant-carrier comprising a bar having blades extending from its edges with a trunnion on one end engaging one of said bearings and an angular socket on its opposite end, a shaft journaled in the other bearing and having an angular end-section engaging said socket, said shaft containing near its outer end a transverse threaded opening, a yoke having a threaded stem engaging said opening, a nut having a tongue extending in and connected with said yoke, and a headed screw-stem engaging said nut and provided in its head with an eye engaging said eccentric journal-stud, for the purpose set forth.

CHARLES B. COON.

In presence of—
A. U. THORIEN,
R. A. SCHAEFER.